Oct. 17, 1933. J. S. CLAPPER 1,930,835
LAWN MOWER WHEEL
Filed June 12, 1931
Fig. 1
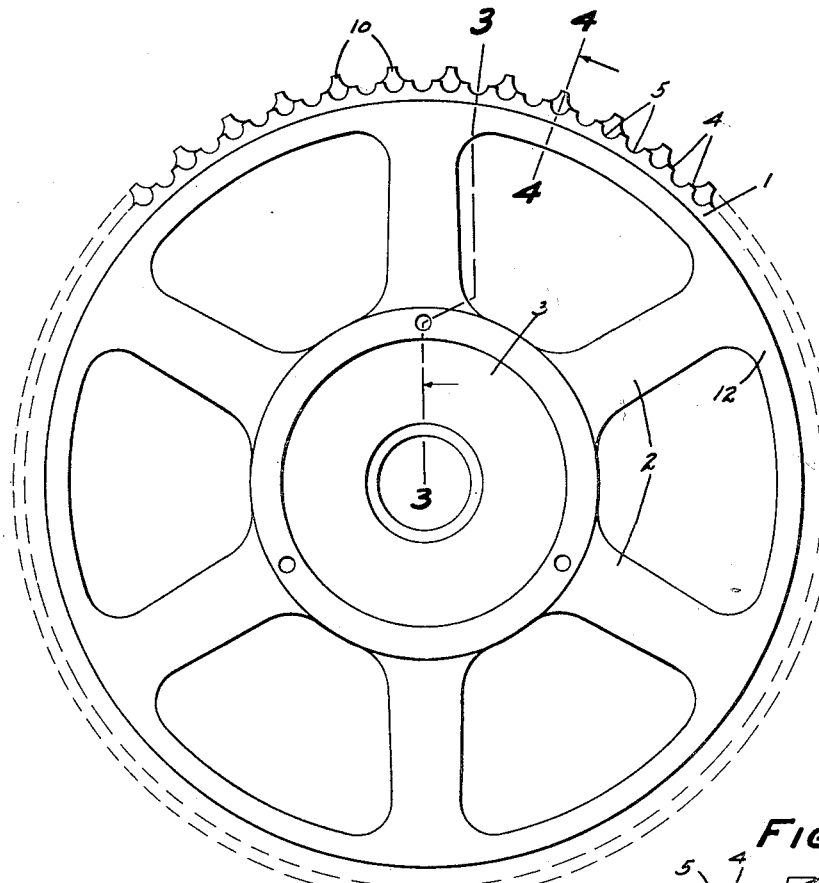
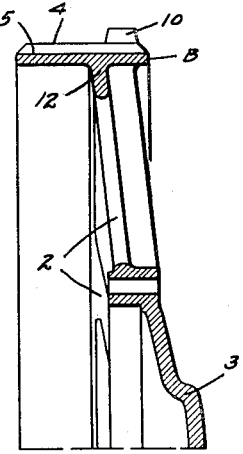
Fig. 3
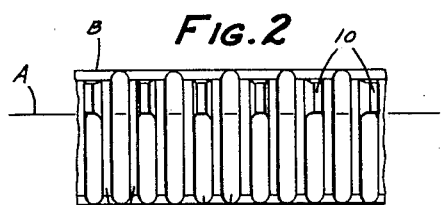
Fig. 2
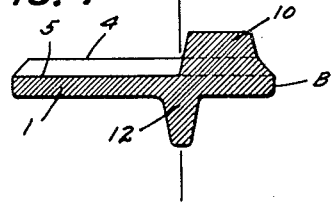
Fig. 4
INVENTOR
JOHN S. CLAPPER
BY
ATTORNEYS Patented Oct. 17, 1933

1,930,835

UNITED STATES PATENT OFFICE 1,930,835

LAWN MOWER WHEEL

John S. Clapper, Minneapolis, Minn., assignor to Toro Manufacturing Company, Minneapolis, Minn., a corporation of Delaware Application June 12, 1931. Serial No. 543,901

1 Claim. (Cl. 301—43)

This invention relates to improvements in lawn mower wheels particularly for mowing or cutting units such as are towed by tractors, and has among its objects to provide means by which the tractive power or grip of the wheel is increased, particularly on turf. Important features of the invention are the provision of traction lugs which may penetrate the root system of the grass to materially increase the tractive effect.

Lawn mower wheels customarily have corrugations extending transversely of the rim, designed to obtain the maximum degree of tractive grip which can be secured without injury to the turf in case slipping should occur as a result of obstruction of the cutters. In the case of hand-operated lawn mowers, the tractive grip of the wheels is increased beyond that directly resulting from the weight of the mower, because the handle is so positioned that there is a downward (diagonal) thrust upon the mower and wheels. In the case of most cutting units which are towed by tractors, and in most gang mowers, the tractive grip is only that which directly results from the weight of the cutting unit, and this tractive grip has frequently proven to be insufficient for the requirements, unless the units are exceptionally heavy. Such weight is contrary to the requirement that the mowers or mower units be of light weight so that the tractor can draw them over hills of parks and golf courses without tractor wheel slippage and consequent turf injury. Wheels for such towed gang mower or cutting units, not only require a minimum of supported weight, but since the cutter of any unit in a gang may become locked by a hard object lodged between the cutting elements, the means for increasing the tractor grip must be such as to cause a minimum of damage to the turf in case the tractor pulls the unit for some distance while the cutters are in locked condition.

The result is that there is substantially no penetration of the relatively long surfaces of the corrugations, but rather a bridging action, and therefore quite frequently there is not sufficient tractive grip. An important feature of the present invention is the provision of traction lugs which materially increase the tractive effect at all times, as a result of penetration of the root system of the grass, but which do not have sufficient area of penetration into said system as will cause injury to any extended area of the system, in case the wheels should become locked, and "drag". Thus the invention provides a maximum of tractive ability, with a minimum of injury to turf in case the wheels become locked.

An important feature relates to the placement of the lugs adjacent the parting line of the mold, to facilitate casting.

Features include all details of constructions shown and described, along with the broader aspects of the invention.

Other objects, features and advantages will be set forth in the description of the drawing forming part of this application, and in said drawing:

Figure 1 is a face view of the inner side of a lawn mower wheel constructed in accordance with the teachings of this invention;

Figure 2 is a face view of a portion of the tread of the wheel, positioned as during a molding operation, and showing that the lugs are arranged adjacent the top of the wheel and adjacent the parting line (see A) of the mold (not shown).

Figure 3 is a section on line 3—3 of Figure 1 further illustrating the relation of the spokes, and hub to one of the sides of the wheel; and, Figure 4 is an enlarged section on line 4—4 of Figure 1 illustrating the relation of the points of connections of the spokes and of the traction lugs to the parting line of the mold.

The numeral 1 generally indicates the rim, the numeral 2 the spokes, and the numeral 3 the hub. The wheel is provided with the usual corrugations, the raised or tooth portions of which are indicated at 4, and the depressed portions at 5.

Arranged at one side of the wheel, (at the upper side when considered with reference to casting position), are a series of radial traction lugs 10 projecting beyond the corrugations, and circumferentially aligned at one side of the center of the tread and extending inwardly from that side; or with reference to casting position extending downwardly from that side. In this instance there is a traction lug for every other depression between the outstanding or tooth portions 4 of the corrugations. In this instance also the working faces of the lugs are of less width than the depressions 5. The base of each lug may be said to be in a depression.

It will be noted that the lugs, and the connecting points 12 of the spokes with the rim, are arranged immediately adjacent one and the same side of the rim. In this instance the circumferential line of attachment of the spokes is substantially in opposition to a line circumferentially joining the inner end of the lugs. The position of the parting line of the mold is indicated by letter A in Figures 2 and 4.

An important design consideration, in relation to foundry practice for castings of this type, is that the parting line of the mold shall not be lower than absolutely necessary. For this reason the arrangement is herein such as to locate the spokes and hub at the top of the wheel, as it is cast. In the present device where the traction lugs are used, the casting operation is considerably simplified and facilitated by also placing the lugs near the top edge of the casting, and therefore adjacent the point of connection of the spokes with the rim. When the wheel is in use these lugs are at the outer side.

An important feature of the invention is this location of the lugs with respect to the parting line of the mold, and with respect to the connecting points of the spokes with the rim. This relation is best shown in Figures 3 and 4. The top of the casting (as during molding) is indicated by the letter B. An important consideration is the circumferential alignment, whatever the transverse location may be.

It is characteristic of cast iron that the more rapidly a portion of the casting cools in the mold the harder it will become. Therefore as practiced herein, the lugs contain only a relatively small body of metal and this is surrounded by a large body of molding sand and therefore cools relatively more quickly and becomes relatively harder. For this reason the small lugs are very resistant to wear. This is a feature of the invention.

It will again be noted that the lugs 10 are circumferentially aligned, and that their working portions are relatively very much smaller than the corresponding portions of the corrugations. In other words they form but a relatively small portion of the traction area. There is a distinct advantage in circumferentially aligning the lugs rather than having them staggered across the tread, because with the staggered arrangement when the lawn mower becomes clogged, the wheel ceases to rotate and is dragged over the turf, and a relatively large area of gashing or tearing of the turf ensues. By using small lugs circumferentially aligned little damage is done under the conditions mentioned, and yet traction effect is substantially increased.

I claim as my invention:

A one piece cast metal lawn mower wheel comprising integral hub, spokes and rim, said rim having transverse corrugations on its lawn engaging face and integrally formed traction lugs extending radially outward from alternate depressions of said corrugations, said lugs extending radially beyond the periphery of said corrugations and being arranged in circumferential alignment, and said lugs, spokes and hub all being disposed at one side of the median plane of said rim.

JOHN S. CLAPPER.